United States Patent

Dickinson

[11] 3,909,227
[45] Sept. 30, 1975

[54] METHOD AND APPARATUS FOR MODIFYING FLOW IN THE REFINING ZONE OF A GLASS MELTING TANK

[75] Inventor: George Alfred Dickinson, St. Helens, England

[73] Assignee: Pilkington Brothers Limited, Lancashire, England

[22] Filed: Jan. 15, 1974

[21] Appl. No.: 433,576

[52] U.S. Cl. .................. 65/134; 65/137; 65/337; 65/347
[51] Int. Cl. .............................................. C03b 5/22
[58] Field of Search ............. 65/134, 135, 136, 137, 65/337, 347

[56] References Cited
UNITED STATES PATENTS
1,641,898  9/1927  Neenan ............................... 65/337
3,615,332  10/1971  Bourggraff et al. ............... 65/134 X Primary Examiner—Arthur D. Kellogg
Attorney, Agent, or Firm—Burn, Doane, Swecker & Mathis

[57] ABSTRACT

A glass melting tank comprising an elongated tank for containing molten glass, said tank having a feeding end at which material is fed into the tank, a working region from which molten glass is taken from the tank, and a refining region between the feeding end and the working region, a hollow fluid cooled pipe extending across at least part of the width of the tank in a region adjacent the junction of the refining and working regions. The pipe may be reciprocated back and forth across the tank and the pipe may have a wave shape. In this way some horizontal transverse displacement of molten glass is effected.

24 Claims, 11 Drawing Figures

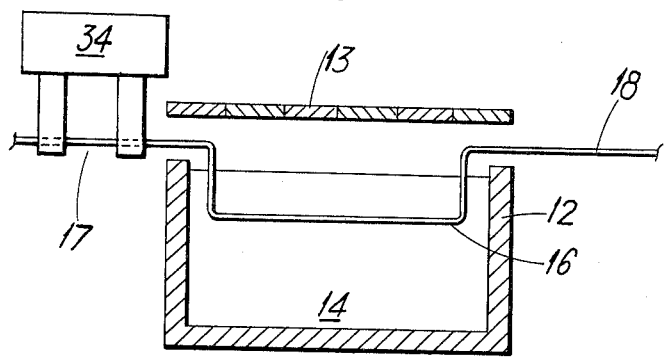

METHOD AND APPARATUS FOR MODIFYING FLOW IN THE REFINING ZONE OF A GLASS MELTING TANK

BACKGROUND OF THE INVENTION

The present invention relates to the production of glass and to glass melting tanks.

In the production of high quality glass, constituent material is fed into a melting region at one end of the tank and passes through a refining region into a working region from which glass is withdrawn from the tank. To achieve good quality glass, it is necessary for the glass in the working region to have a high degree of homogeneity. This is assisted by the operation which occurs in the refining region. When the glass material passes along the tank from the melting region, there are inevitably composition variations as well as temperature variations in the molten material. The molten glass passes slowly through the refining zone where circulation occurs due to convection currents. The material looses gases and becomes more equalised in temperature and composition. As the surface glass may have a higher temperature than the remainder, there is a tendency for the surface glass to flow more quickly into the working region and to reduce this tendency, floaters and skimmers have been used to control the rate of flow. It is also normally necessary to provide stirrers to improve the homogeneity of the glass. However, such floaters and stirrers must not react chemically with the glass otherwise the composition of the glass will be changed in the region of these devices and furthermore, they must be made of material capable of withstanding the high temperatures and atmosphere present.

It is an object of the present invention to provide improved apparatus for achieving good homogeneity in the glass while avoiding the problems previously encountered with skimmers and floaters and to reduce the need for stirrers. It will be appreciated that it is important to achieve the required homogeneity otherwise variations in composition may produce defects in the quality finished glass product which may appear as ream and stria. These defects form horizontal or wedge shaped layers which differ in composition from the surrounding glass.

SUMMARY OF THE INVENTION

The invention provides a method of producing glass comprising melting constituent material in a glass melting tank and refining the molten glass in a refining region before the glass passes to a working region from which glass is withdrawn from the tank, said method including modifying flow of molten glass in the refining region and from the refining region to the working region so as to improve the homogeneity of the glass, by circulating cooling fluid through a pipe or pipes extending generally horizontally across at least part of the tank through the upper region of the molten glass, at or near the junction of the refining region with the working region, and effecting transverse horizontal displacement of molten glass in the forward flow of glass adjacent the pipe or pipes.

The transverse displacement of molten glass may be effected by moving the pipe or pipes back and forth across the tank. The pipe or pipes may be wave shaped so that some transverse displacement is caused by the shape of the pipe or pipes.

The invention also provides a glass melting tank comprising an elongated tank for containing molten glass, said tank having a feeding end at which material is fed into the tank, a working region from which molten glass is tank from the tank, and a refining region between the feeding end and the working region, one or more hollow fluid cooled pipes extending across at least part of the width of the tank in a region adjacent the junction of the refining and working regions, said pipe or pipes being located at a height above the bottom of the tank such as to be submerged in the upper region of the molten glass, and arranged to effect transverse horizontal displacement of molten glass in the forward flow of glass adjacent the pipe or pipes.

Reciprocating means may be provided to move the pipe or pipes back and forth across the tank and thereby induce transverse displacement of the molten glass.

By use of a reciprocating fluid cooled pipe, the flow from the refining region to the working region is modified so as to improve the homogeneity of the glass reaching the working region.

The pipe or pipes may be straight or may include vertical as well as horizontal sections. The pipes may be of square wave shape. In this way, a larger area of glass may be affected without obstructing flow from or to the refining region.

The invention also provides a glass melting tank comprising an elongated tank for containing molten glass, said tank having a feeding end at which material is fed into the tank, a working region from which molten glass is taken from the tank, and a refining region between the feeding end and the working region, a hollow fluid cooled pipe extending across at least part of the width of the tank in a region adjacent the junction of the refining and working regions, said pipe being located at a height above the bottom of the tank such as to be submerged in the upper region of the molten glass, and being shaped in a wave like form extending transverse to the length of the tank.

Preferably the pipe comprises alternate vertical and horizontal sections forming a substantially square wave pattern. Preferably the vertical sections are all of the same depth.

The wave pattern may be uniform along the length of the pipe or alternatively the length of the horizontal sections may vary to alter the pitch of the wave pattern. In this way, the pipe may have a different modifying effect on the glass at different positions across the width of the tank. The length of the horizontal sections, may be less in the centre of the tank to provide greater wave density in the centre of the tank.

The pipe may be provided with reciprocating means for moving the pipe back and forth across the tank.

In all embodiments of the invention, the or each pipe preferably extends horizontally and it may be perpendicular or inclined to the length of the tank. The tank may be provided with a narrow section leading from the refining region and the or each pipe is located in, or adjacent to, the narrow region.

The or each pipe may be water cooled and may for example be formed of steel.

Regardless of the shape of the pipe or pipes, it is preferred that the depth of the pipe or pipes is such that the pipe or pipes lie wholly within the upper half of the body of molten glass. The height of the pipe or pipes within the tank is preferably adjustable. This may be achieved by rotating the pipe about a horizontal axis.

The pipe or pipes may be arranged with inlet and outlet ends at opposite sides of the tank or at the same side of the tank.

BRIEF DESCRIPTION OF THE DRAWINGS

FIG. 11 shows a further embodiment with a straight reciprocating pipe.

DESCRIPTION OF THE PREFERRED EMBODIMENTS

Figure 1:
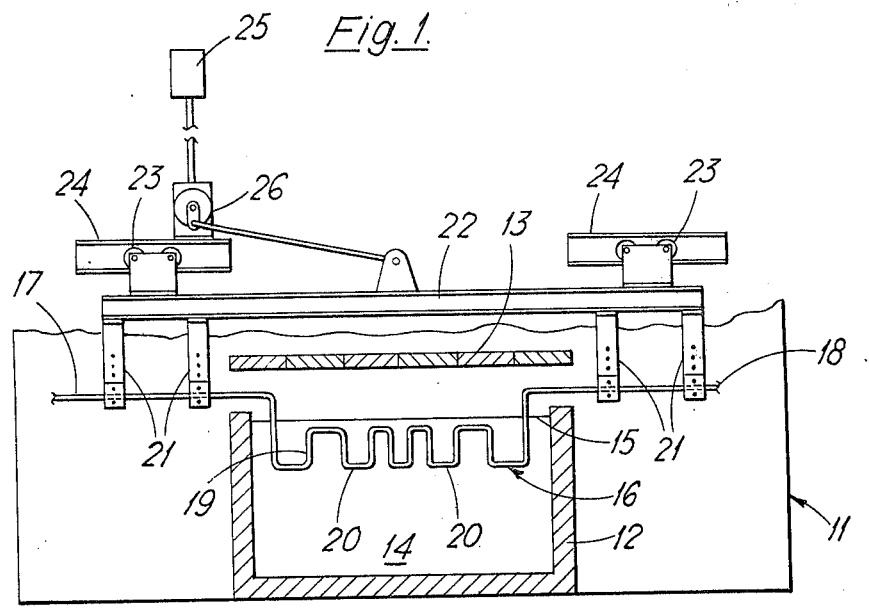
FIG. 1 is a section through the waist region of a glass melting tank embodying the present invention.
Figure 10:
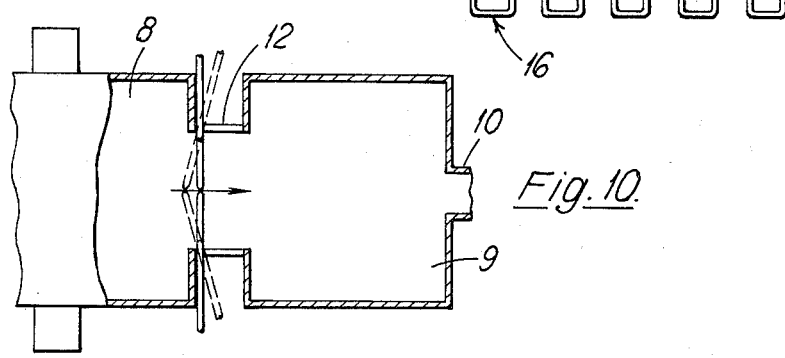
FIG. 10 shows a plan view of part of a glass melting tank embodying the present invention.

FIG. 1 shows a glass melting tank 11 which comprises an elongated tank formed with refractory walls, floor and roof although the roof is omitted from the drawings. At one end of the tank is a melting region to which glass forming constituent material is fed. Heating units are provided within the furnace for heating the glass within the tank. The molten glass moves along the tank through a refining region 8 to a working end 9 adjacent an outlet 10, as shown in FIG. 10. The tank is of constant depth along its length and the width of the tank is constant except for a waist region marked 12 where the side walls are inset to provide a narrow region interconnecting the refining area with the working end. Above the waist region is a ceiling 13 formed of refractory members. In use, molten glass 14 fills the tank to a level 15. In the arrangement of FIG. 1, a water cooled pipe 16 extends across the waist. The pipe 16 has an inlet 17 and outlet 18 at opposite sides of the waist, and extends generally horizontally across the tank perpendicular to the length of the tank. As shown in FIG. 1, this embodiment uses a pipe of square wave formation the vertical sections 19 being of constant height although the horizontal sections 20 are of variable length to change the wave density across the width of the tank. In the example shown, the horizontal sections 20 are shortest at the centre of the tank and longest at the sides of the waist region. In this way, a greater wave density is achieved in the middle of the tank. The inlet and outlet ends of the pipe are both supported on adjustable mountings 21 located at each side of the tank so that the depth of the pipe within the tank may be varied. As is shown in FIG. 1, the pipe is arranged so as to be submerged below the surface 15 of the molten glass but the lower edges of the pipe do not project below the mid-point in depth of the molten glass. In this way, the cooled pipe affects only the upper half of the molten glass. The supports 21 are mounted on a beam 22 hanging from wheels 23 rolling along rails 24. A drive motor 25 is connected to a gear box and crank arrangement 26 the crank being connected to the beam 22 so as to reciprocate the beam 22 and thereby move the pipe 16 horizontally back and forth across the waist region in the tank. The speed of movement of the pipe is arranged to be of the order of 1 or 2 feet a minute. The extent of displacement of the pipe is of the order of one foot maximum.

The pipe 16 is located across the entrance of the waist region leading from the refining zone. In use of the glass melting tank, the upper part of the molten glass is generally hotter than that at the bottom of the tank and convection currents are set up in the refining and working zones. The use of the cooling pipe 16 modifies the temperature and flow rate of the upper part of the molten glass in the refining and working zones and produces greater homogeneity of glass in the working region. It retards the speed of flow of the upper part of the molten glass towards the working region. The glass in the bottom part of the tank tends to flow back towards the inlet end of the tank and the pipe 16 does not project low enough to reach the region of return flow.

By use of the square wave pipe shown in FIG. 1, the pitch of the waves may be varied to suit the particular conditions in the tank. In the example shown the waves are closer together at the centre of the tank so as to produce greater effect on the central region of the tank. This is particularly suitable as the glass would normally be cooler towards the side of the tank and thereby need less close spacing of the waves. In addition to the cooling pipe 16, mechanical stirrers may be provided in the waist region although these may be omitted.

Figure 2:
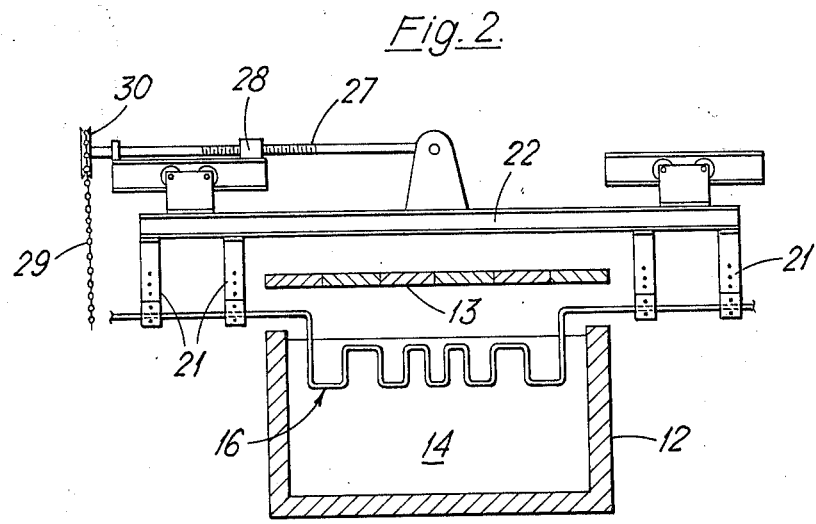
FIG. 2 is a similar section through an alternative embodiment.

FIG. 2 shows a modified embodiment in which similar numerals have been used for similar parts. In this case, the beam 22 is reciprocated by means of a rotating screw 27 engaging a nut 28 fixed on the rails 24. The screw 27 is turned by a chain 29 engaging a chain wheel 30 fixed to one end of the screw 27. By movement of the chain 29 alternately in opposite directions, the beam 22 may be moved back and forth to reciprocate the pipe 16 as previously described with reference to FIG. 1.

Figure 3:
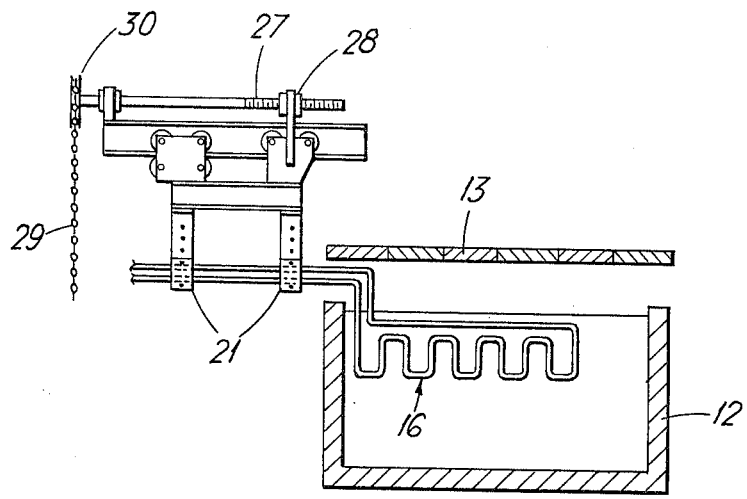
FIG. 3 is a similar section through a further embodiment.

The arrangement shown in FIG. 3 is generally similar to that described in FIG. 2 except that the pipe 16 is provided with a uniform wave pattern, each of the horizontal sections 20 of the pipe 16 being of equal length. Furthermore, the inlet and outlets 17 and 18 of the pipe are both provided on the same side of the tank so that both ends of the pipe are mounted on the same supports 21. In the FIG. 3 arrangement, it is possible to provide a similar pipe projecting inwards from the right hand side of the tank together with a similar mounting and reciprocating mechanism so that the two square wave pipes overlap each other and reciprocate in opposite directions. The second pipe and mounting mechanism is however omitted for clarity.

Figure 4:
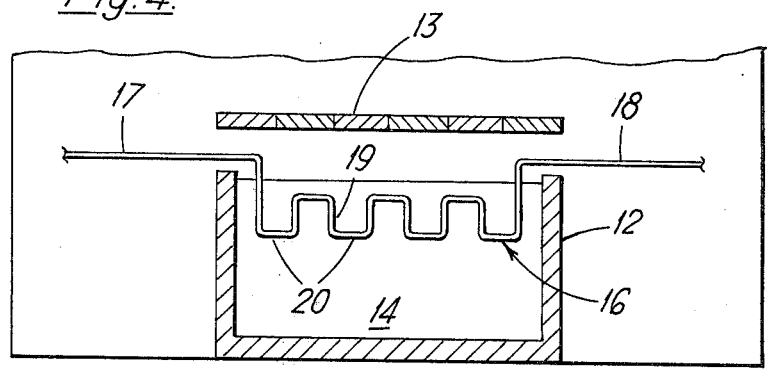
FIG. 4 is a section through a glass melting furnace taken adjacent a waist region, also embodying the invention.
Figure 5:
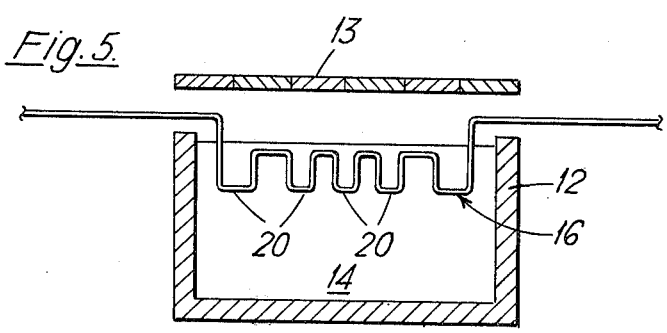
FIG. 5 shows a modification of part of FIG. 4.

The water cooled pipe 16 need not be reciprocated back and forth across the tank. Such an arrangement is shown in FIG. 4 in which similar reference numerals have been used. In this case, a pipe of uniform square wave pattern extends across the waist region as previously described although in this case, the pipe is stationary. FIG. 5 shows a similar stationary pipe in which the square wave pattern of the pipe is varied to produce a higher wave density in the central region of the tank.

Figure 6:
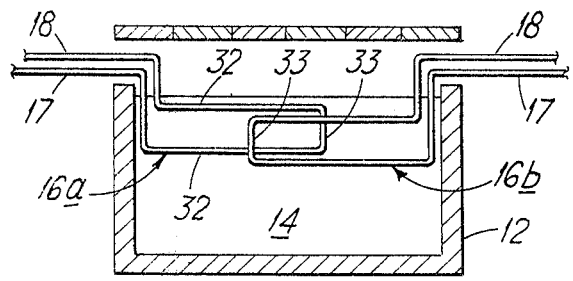
FIG. 6 shows a further modification of part of FIG. 4.

The pipe need not necessarily be of a wave pattern and FIG. 6 shows such an arrangement in which two hollow pipes 16a and 16b project in from opposite sides of the tank. In each case the pipe forms a rectangular loop having two horizontal sections 32 connected by a vertical section 33 at the inner edge of the loop. In this case the two pipes overlap each other to provide greater cooling in the central region of the tank. Each pipe has its inlet located at the same side of the tank as its outlet. The inlet and outlet are mounted on adjustable supports similar to those shown in FIG. 1. The supports are in turn connected to a reciprocating mechanism as described with reference to FIG. 1 or 2 so that the closed loop pipes may be reciprocated across the width of the tank.

Figure 7:
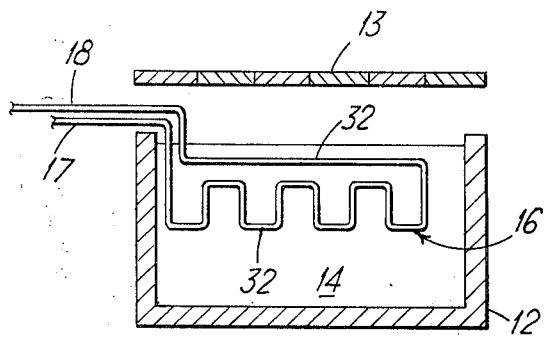
FIG. 7 shows a further modification of part of FIG. 4.

FIG. 7 shows a modified arrangement similar to FIG. 6 but in which the lower arm 32 of the rectangular loop is itself formed as a square wave. Although only one pipe is shown in FIG. 7, two overlapping pipes projecting inwards from opposite sides will be used, as described with reference to FIG. 6. In this case, the two looped pipes may be stationary or may be provided with a reciprocating mechanism as previously described.

Figure 8:
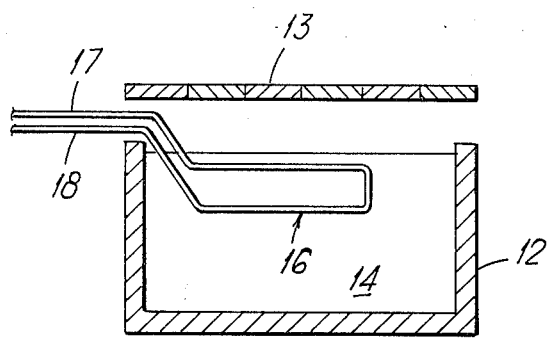
FIG. 8 shows a further modification of part of FIG. 4.

FIG. 8 shows a further modification of the arrangement shown in FIG. 6. In this case the arrangement is substantially as described with reference to FIG. 6 except that the part of the pipes entering the molten glass from the inlet 17 and outlet 18 are arranged at an angle of approximately 45° to the vertical. In the arrangements shown in FIGS. 6, 7 and 8, a protecting sheath may be provided around the parts of the pipe outside the furnace atmosphere and leading to below the surface of the molten glass. Such sheaths may prevent errosion or corrosion at the glass surface or by the furnace atmosphere. Such sheaths could be of inert material such as platinum or a platinum rhodium alloy or a sacrificial material such as an additional layer of steel.

Figure 9:
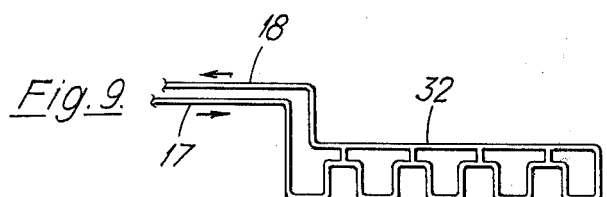
FIG. 9 shows a modified pipe arrangement for use in any one of FIGS. 1 to 8.

FIG. 9 shows a further modified pipe arrangement similar to that shown in FIG. 7 but in which the upper horizontal pipe 32 is connected to the top of each square wave. In use, one pipe as shown in FIG. 9 may be arranged to extend across the width of the waist region or alternatively two pipes may be arranged each projecting in from opposite sides of the tank. The pipes may be stationary or mounted on a reciprocating mechanism. The arrangement shown in FIG. 9 is advantageous in preventing air locks in the water within the pipes.

In the arrangement shown in FIG. 10, two pipes 16a and 16b project in from opposite sides of the waist 12 at the upstream end of the waist nearest the refining section 8. The two pipes may be of square wave form and may if desired be connected to a reciprocating mechanism similar to that as previously described. The pipes may extend perpendicular to the tank as shown in full lines or be inclined as shown in broken lines.

FIG. 11 shows the arrangement of one straight water cooled pipe 16 extending across the waist region perpendicular to the length of the tank. The pipe has an inlet and outlet at opposite sides of the tank and is connected to reciprocating means 34 which may be of the type shown in FIGS. 1 and 2.

In all the above examples, the inlet and outlet ends of the pipe 16 are connected to a cooling water supply circuit so that cooling water is continuously circulated through the pipes. Due to the cooling it is possible for the pipes to be made of steel. This does not react with the glass, and avoids the need for platinum coating as was the case with previously used floaters and stirrers.

In one example, the pipes 16 used were three inch diameter pipes with a water inlet temperature of 32°C and an outlet temperature of 34°C. Water was circulated at 240 gallons per minute.

In all the above examples the pipes 16 cause some horizontal transverse displacement of molten glass in the forward flow of molten glass in the waist region. This transverse displacement is assited by the reciprocating action of the pipes in those cases where reciprocating action is provided. In the cases of wave like pipes with no reciprocation, transverse displacement is still effected by the vertical sections of the pipe which cause some horizontal displacement of the molten glass to permit passage through the spaces between vertical sections. Such horizontal displacement in a transverse direction is advantageous in that it tends to stretch the glass horizontally and any inhomogeneity remaining in the glass is caused to lie in horizontal layers rather than extending vertically through the glass. Inhomogeneity is less troublesome when confined to horizontal substantially parallel layers.

I claim:

1. In a method of producing glass wherein constituent material is melted in a melting region of glass melting tank and the molten glass is refined in a refining region through which it passes into a working region from which glass is withdrawn from the tank, the improvement for enhancing the homogeneity of the glass through modifying the flow of molten glass in the refining region and from the refining region into the working region comprising:

retarding the flow of the upper region of the molten glass towards the working region by disposing at least one pipe generally horizontally across at least part of the tank in a posture extending across the centre of the molten glass flow path through the upper region of the molten glass, at or near the junction of the refining region with the working region;

modifying the temperature of the upper region of the molten glass by circulating cooling fluid through said at least one pipe; and transversely displacing molten glass in the forward flow of glass adjacent said at least one pipe by moving said at least one pipe transversely across the tank so as to tend to induce stretching of the glass prior to entry into the working region.

2. In a method of producing glass wherein constituent material is melted in a melting region of a glass melting tank and the molten glass is refined in a refining region through which it passes into a working region from which glass is withdrawn from the tank, the improvement for enhancing the homogeneity of the glass through modifying the flow of molten glass in the refining region and from the refining region in the working region comprising:

retarding the flow of the upper region of the molten glass toward the working region by disposing at least one pipe generally horizontally across at least part of the tank in a posture extending across the centre of the molten glass flow path through the upper region of the molten glass, at or near the junction of the refining region with the working region;

modifying the temperature of the upper region of the molten glass by circulating cooling fluid through said at least one pipe; and transversely displacing molten glass in the forward flow of glass adjacent said at least one pipe by vertical sections of said at least one pipe which are spaced apart across the centre of the molten glass flow path and which engender transverse displacement of the molten glass as the glass passes through spaces between said vertical section so as to tend to induce stretching of the glass horizontally prior to entry into the working region.

3. In a method of producing glass wherein constituent material is melted in a melting region of a glass melting tank and the molten glass is refined in a refining region through which it passes into a working region from which glass is withdrawn from the tank, and wherein the upper region of the molten glass in the tank is generally hotter than the bottom region and convection currents are set up in the refining and working zones, the improvement for enhancing the homogeneity of the glass through modifying the flow of molten glass in the refining region and from the refining region into the working region comprising:

retarding the flow of the upper region of the molten glass toward the working region by disposing at least one pipe generally horizontally across at least part of the tank in a posture extending across the centre of the molten glass flow path through the upper region of the molten glass, at or near the junction of the refining region with the working region, while glass in the lower region tends to return flow;

modifying the temperature of the upper region of the molten glass by circulating cooling fluid through said at least one pipe; and transversely displacing molten glass in the forward flow of glass adjacent said at least one pipe by moving said at least one pipe transversely across the tank so as to tend to induce stretching of the glass horizontally, 4. In a method of producing glass wherein constituent material is melted in a melting region of a glass melting tank and the molten glass is refined in a refining region through which it passes into a working region from which glass is withdrawn from the tank, and wherein the upper region of the molten glass in the tank is generally hotter than the bottom region and convection currents are set up in the refining and working zones, the improvement for enhancing the homogeneity of the glass through modifying the flow of molten glass in the refining region and from the refining region into the working region comprising:

retarding the flow of the upper region of the molten glass toward the working region by disposing at least one pipe horizontally across at least part of the tank in a posture extending across the centre of the molten glass flow path through the upper region of the molten glass, at or near the junction of the refining region with the working region, while glass in the lower region tends to return flow;

modifying the temperature of the upper region of the molten glass by circulating cooling fluid through said at least one pipe; and transversely displacing molten glass in the forward flow of glass adjacent said at least one pipe by vertical sections of said at least one pipe which are spaced apart across the centre of the molten glass flow path and which induce some horizontal displacement of the molten glass to permit passage through spaces between said vertical sections so as to induce stretching of the glass horizontally.

5. In a glass producing apparatus including a tank for containing molten glass and having a feeding end at which material is fed into the tank, a working region from which molten glass is taken from the tank, and a refining region through which glass flows between the feeding end and the working region, the improvement for enhancing the homogeneity of the glass through modifying the flow of molten glass in the refining region and from the refining region into the working region comprising:

hollow fluid cooled pipe means disposed, at or near the junction of said refining region with said working region, generally horizontally across at least part of the tank in a posture extending across the centre of the molten glass flow path at a height above the tank bottom such as to be submerged in the upper region of molten glass, said pipe means being operable to retard the flow of the upper region of the molten glass toward the working region, cool the temperature of the upper region of the molten glass, and reciprocating means for effecting movement of said pipe means transversely across the tank to effect transverse displacement of molten glass in the forward flow of glass adjacent thereto so as to induce stretching of the glass horizontally prior to entry into the working region.

6. In a glass producing apparatus including a tank for containing molten glass and having a feeding end at which material is fed into the tank, a working region from which molten glass is taken from the tank, and a refining region through which glass flows between the feeding end and the working region, the improvement for enhancing the homogeneity of the glass through modifying the flow of molten glass in the refining region and from the refining region into the working region comprising:

hollow fluid cooled pipe means disposed, at or near the junction of said refining region with said working region, generally horizontally across at least part of the tank in a posture extending across the centre of the molten glass flow path at a height above the tank bottom such as to be submerged in the upper region of molten glass, said pipe means being operable to retard the flow of the upper region of the molten glass toward the working region, cool the temperature of the upper region of the molten glass, and wherein said pipe means includes vertical sections which are spaced apart across the centre of the molten glass flow path and which engender transverse displacement of the molten glass as the glass passes through spaces between said vertical sections so as to induce stretching of the glass horizontally prior to entry into the working region.

7. Apparatus according to claim 6 wherein said pipe means is shaped in a wave-like form extending transverse to the length of the tank.

8. Apparatus according to claim 7 including reciprocating means for effecting movement of said pipe means transversely across the tank to enhance said transverse displacement by said pipe means.

9. Apparatus according to claim 5 in which the pipe means extends horizontally and perpendicular to the length of the tank.

10. Apparatus according to claim 5 in which the tank is provided with a waist between the refining and working regions and the pipe means is located in, or adjacent to, the waist region.

11. Apparatus according to claim 5 in which the pipe means is water cooled.

12. Apparatus according to claim 5 in which the height of the pipe means within the tank is adjustable.

13. Apparatus according to claim 5 in which the pipe means is arranged with inlet and outlet ends at opposite sides of the tank.

14. Apparatus according to claim 5 in which the pipe means is arranged with inlet and outlet ends at the same side of the tank.

15. Apparatus according to claim 5 in which the pipe means comprises more than one fluid cooled pipe.

16. Apparatus according to claim 6 in which the pipe means comprises alternate vertical and horizontal sections forming a substantially square wave pattern.

17. Apparatus according to claim 16 in which the vertical sections are all of the same depth.

18. Apparatus according to claim 17 in which the wave pattern is uniform along the length of the pipe.

19. Apparatus according to claim 16 in which the length of the horizontal sections varies to alter the pitch of the wave pattern.

20. Apparatus according to claim 19 in which the length of the horizontal sections is less in the center of the tank to provide greater wave density in the center of the tank.

21. In a method according to claim 2, moving said at least one pipe having spaced apart vertical sections, horizontally back and forth across the molten glass flow path.

22. Apparatus according to claim 6 in which the tank is provided with a waist between the refining and working regions and the pipe means is located in, or adjacent to, the waist region.

23. Apparatus according to claim 6 in which the pipe means is water cooled.

24. Apparatus according to claim 6 in which the height of the pipe means within the tank is adjustable.

* * * * *